United States Patent Office 3,579,467
Patented May 18, 1971

3,579,467
ORGANOPOLYSILOXANES HAVING
HYDROXYARYL SUBSTITUENTS
Edgar D. Brown, Jr., Schenectady, N.Y., assignor to
General Electric Company
No Drawing. Continuation-in-part of application Ser. No. 600,787, Dec. 12, 1966. This application Nov. 27, 1968, Ser. No. 779,622
Int. Cl. C10m 1/50
U.S. Cl. 252—46.3   11 Claims

ABSTRACT OF THE DISCLOSURE

Organopolysiloxanes useful as hydraulic fluids comprise organopolysiloxanes in which a majority of the siloxane groups contain methyl radicals and higher alkyl radicals, and a minor proportion of the siloxane groups contain silicon-bonded tertiary butyl-substituted hydroxyaryl radicals attached to silicon through a divalent propylene radical. Optionally, a minor amount of aryl and aralkyl radicals can also be present on the siloxane groups. These compounds are prepared by reacting polysiloxanes containing methylhydrogen units and phenylhydrogen units with higher alkenes and hydroxyaryl compounds containing both nuclear substituted allyl radicals and nuclear substituted tertiary butyl radicals.

---

This application is a continuation in part of my copending application Ser. No. 600,787 filed Dec. 12, 1966, and assigned to the same assignee as the present invention, now abandoned.

The present invention is directed to a new class of organopolysiloxane lubricant compositions of improved oxidation stability.

In my copending application Ser. No. 421,588 filed Dec. 28, 1964, and assigned to the same assignee as the present invention, now U.S. Pat. 3,418,353 dated Dec. 24, 1968, there is described a class of organopolysiloxanes which includes triorganosilyl chain-stopped polydiorganosiloxanes in which each of the diorganosiloxane units contain a silicon-bonded methyl radical and a silicon-bonded higher alkyl radical. The copending application also discloses silicon-bonded methyl and higher alkyl radicals in combination with silicon-bonded aryl or aralkyl radicals. These compositions are extremely useful as lubricants between moving surfaces and are especially useful in the lubrication of relatively movable aluminum parts which have been heretofore almost impossible to lubricate. While these lubricating compositions do an admirable job of lubricating aluminum and other parts at room temperature, it has been found that at elevated temperatures, these compositions tend to gel and lose their usefulness in a shorter time than is desired for some application.

The present invention is based on an improved organopolysiloxane lubricating composition which retains the unusually good lubricating characteristics and hydraulic fluid properties of the compositions of my aforementioned copending application and, in addition, exhibits vastly improved oxidative stability at elevated temperatures.

The organopolysloxane compositions of the present invention comprise organopolysiloxanes in which a majority of the organosilxane groups contain methyl groups and higher alkylsiloxane groups and which, in addition, can contain a minor amount of aryl groups or aralkyl groups. The remainder of the organosiloxane groups contain silicon-bonded tertiary butyl-substituted hydroxyaryl radicals attached to silicon through a divalent propylene radical.

The fluids of the present invention have found application as hydraulic fluids, heat transfer fluids, lubricating fluids and are used in the manufacture of greases. The fluids containing aromatic substituents are particularly valuable as hydraulic fluids for high speed aircraft application which subject the fluids to wide temperature variations.

The fluid organopolysiloxanes of the present invention have the average unit formula:

(1) 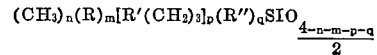

wherein the sum of $(m+n+p+q)$ has a value of from 2.05 to 3.0; $n$ has a value of from .50 to 1.95; $m$ has a value of from .50 to 1.00; $p$ has a value of from 0.005 to 0.1; $q$ has a value of from 0 to 0.25 $(m+n+p)$; R represents a higher alkyl radical containing at least 8 and not more than 18 carbon atoms; R' is a residue of a t-butyl-substituted hydroxyaryl radical and R" is an organic radical of not more than 18 carbon atoms selected from the class consisting of mononuclear and binuclear aryl, and mononuclear aryl lower alkyl.

In the above formula, R' is preferably selected from the class consisting of

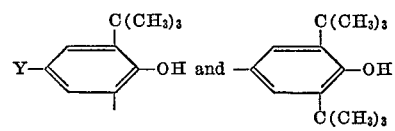

wherein Y is selected from the group consisting of hydrocarbyl and hydroxy-substituted hydrocarbyl of at least one and not more than 18 carbon atoms, and $X_fR^3$─$[D]$─ wherein D is selected from the class consisting of ─O─, ─S─, ─CH$_2$OCH$_2$─ and divalent hydrocarbon radicals of at least one and not more than eight carbon atoms, $R^3$ is hydroxyaryl, X is selected from the class consisting of ─CH$_2$CH$_2$CH$_2$─ and ─CH$_2$CH=CH$_2$ and is attached at the ortho position relative to the hydroxyl group of the hydroxyaryl, and $f$ is an integer of 0 or 1, provided that when X is ─CH$_2$CH$_2$CH$_2$─ the unsatisfied valence bond is attached to an Si atom of an adjacent polysiloxane radical. The hydroxy aryl group of $R^3$ is preferably mononuclear but can be binuclear and is preferably subsituted by two t-butyl groups ortho to the hydroxyl group. R" can be, for example, phenyl, naphthyl, biphenyl, tolyl, xylyl, etc. radicals, and mononuclear aryl lower alkyl radicals having one to 7 carbon atoms in the alkyl group, e.g., benzyl, phenylethyl, etc. radicals.

It should be understood that the methylalkylpolysiloxare fluids of Formula 1 can include siloxane units of varied types and formulation, such as trimethylsiloxane units and methylalkylsiloxane units alone or in combination with units such as monomethylsiloxane units, monoalkylsiloxane units, dialkylsiloxane units, trialkylsiloxane units, etc. The only requirement is that the ratio of the various siloxane units employed be selected so that the average composition of the copolymeric fluid is within the scope of Formula 1.

The preferred methylalkyl lubricating compositions of the present invention have the average formula:

(2) 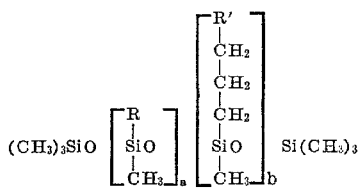

where R and R' are as previously defined, the sum of $a$ plus $b$ is from 5 to 40, inclusive, and the ratio of $b$ over the sum of $a$ plus $b$ is equal to from 0.005 to 0.1, inclusive.

From the description of the average composition of Formula 2, it is seen that an average molecule can contain both diorganosiloxane units containing methyl and higher alkyl substituents and diorganosiloxane units containing methyl and t-butyl-substituted hydroxyarylpropyl substituents. It is also seen that because of the values of $a$ and $b$ in the average composition of Formula 2, some of the molecules of the siloxane composition need not contain any methyl t-butylhydroxyarylpropylsiloxane units.

Thus, it is apparent that the compositions within the scope of the present invention have the average empirical composition of Formula 2 and can comprise mixtures of (A) triorganosilyl chain-stopped methyl higher alkylpolysiloxanes having the formula:

(3) 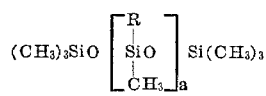

and (B) organopolysiloxane compositions having the formula:

(4) 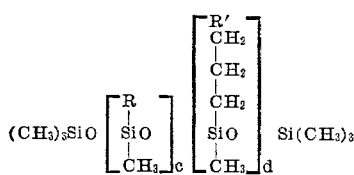

and/or cyclic organopolysiloxanes having the formula:

(5) 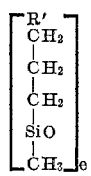

where R and R' are as previously defined, where $a$ has a value of from 5 to 40, inclusive, $c$ has a value of from 0 to 39, inclusive, $d$ has a value of from 1 to 40, inclusive, the sum of $c$ plus $d$ is equal to from 1 to 40, inclusive, and $e$ has a value of from 3 to 7, inclusive. Where the composition within the scope of Formula 2 is a mixture of compositions within the scope of Formula 3 with compositions within the scope of Formula 4 and/or Formula 5, the relative proportions of the various compositions are selected so as to provide the average composition set forth in Formula 2.

As an illustration of the selection of the proper proportions of compositions within the scope of Formula 2 with predetermined radicals represented by both R and R', where it is desired to produce a composition within the scope of Formula 2 in which $a$ is equal to 39 and $b$ is equal to 1, a blend is prepared of one mole of the composition within the scope of Formula 3 in which $a$ is equal to 40 and two moles of a composition within the scope of Formula 4 in which $c$ is equal to 38 and $d$ is equal to 2.

As a further illustration of the use of blends to produce compositions within the scope of Formula 2, a composition within the scope of Formula 2 having fixed values for R and R' and in which $a$ is equal to 18 and $b$ is equal to 0.5, is prepared by blending 10 moles of a polysiloxane within the scope of Formula 3 when $a$ is equal to 20 and one mole of a polysiloxane within the scope of Formula 5 in which $e$ is equal to 4.

A blend of materials having an average composition within the scope of Formula 2 which is prepared from a methyl higher alkylpolysiloxane within the scope of Formula 3, a copolymer of methyl higher alkylpolysiloxane and methyl t-butyl-substituted hydroxyarylpropylpolysiloxane of Formula 4 and a cyclic material of Formula 5 is illustrated by the preparation of a composition having the average formula within the scope of Formula 2 where R and R' are predetermined radicals and where $a$ has a value of 28.4 and $b$ has a value of 1.1. Such a composition is prepared by blending 10 moles of the composition of Formula 3 with the appropriate R group and having $a$ equal to 30 with 2 moles of a copolymer within the scope of Formula 4 having the appropriate R and R' groups and with $c$ equal to 35 and $d$ equal to 40 and one mole of a composition of Formula 5 in which R' is the appropriate radical and in which $e$ is equal to 4. The blending of this material results in the preparation of a composition having the average formula described above.

R in the above formulas can be, for example, octyl, decyl, dodecyl, tetradecyl, hexadecyl or octadecyl radicals.

The R' radical of Formulas 1, 2, 4 and 5 which is a t-butyl-substituted hydroxyaryl radical preferably has the formula:

(6) 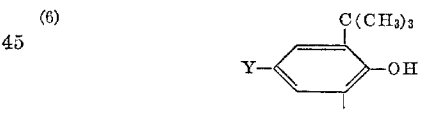

As is seen from Formulas 1, 2, 4 and 5, the R' radical has a valence bond attached to the aromatic nucleus and to a divalent propylene radical which, in turn, is attached to a silicon atom of the polysiloxane. In the ortho position with respect to this valence bond is a hydroxy radical and in the meta position is a teritary butyl radical. In the other meta position is the Y radical previously described. The t-butyl group is adjacent to the hydroxyl group and hinders its reactivity. Thus, the hydroxyaryl radical is a hindered hydroxyaryl radical.

Among the monovalent hydrocarbon radicals free of aliphatic unsaturation represented by Y are, for example, alkyl radicals, e.g., methyl, ethyl, propyl, butyl and octyl radicals; aryl radicals, e.g., phenyl and naphthyl radicals; aryl lower alkyl radicals, e.g., benzyl and phenylethyl radicals. Among the hydroxyaryl radicals represented by Y are, for example, o,o-di(t-butyl)-p-hydroxyphenyl and o-(t-butyl)-o-allyl-p-hydroxyphenyl radicals. Illustrative of the hydroxyaryl-substituted monovalent hydrocarbon radicals within the definition of Y are, for example, p-hydroxyphenylmethyl radicals and o,o-di(t-butyl)-p-hydroxyphenylethyl radicals. Illustrative of the hydroxyaryl-ether radicals is the o,o-di(t-butyl)-p-hydroxyphenylether radical. Illustrative of the hydroxyarylmethylene ether radical is the o,o-di(t-butyl)-p-hydroxyphenylmethylene ether radical. Illustrative of the hydroxyarylthioether radicals is the o,o-di(t-butyl)-p-hydroxyphenylthioether radical, etc.

Illustrative of specific radicals represented by R' are, for example:

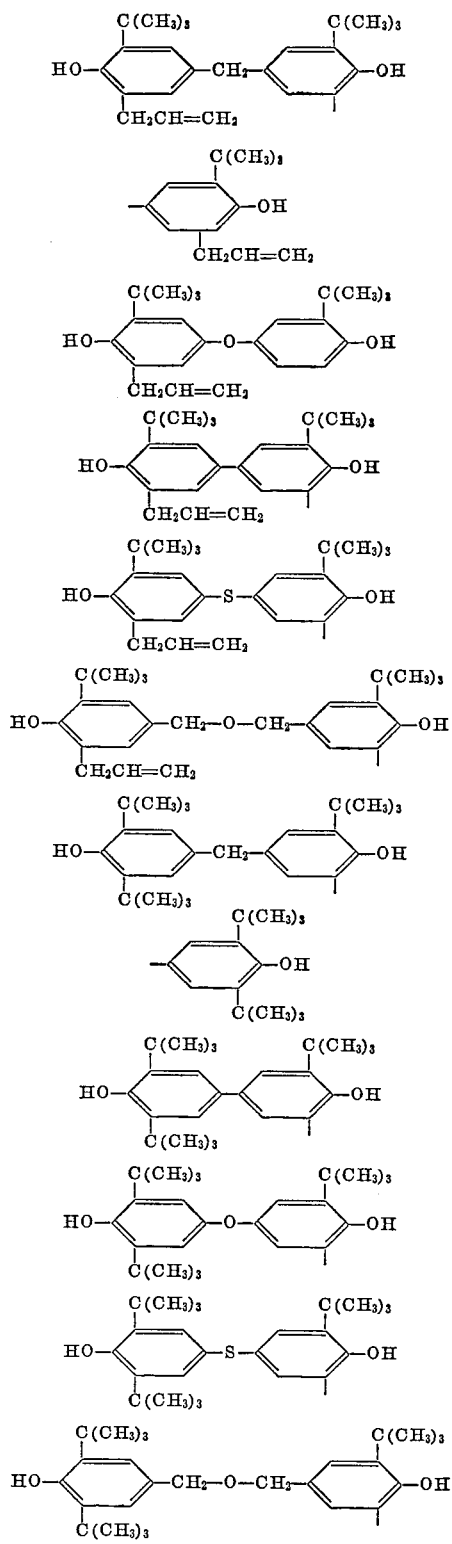

Illustrative of the R' radicals which are formed when two allyl groups of an allylated phenol react with methyl hydrogen siloxy groups are the following radicals which are residues of a hindered t-butyl-substituted hydroxyaryl radical.

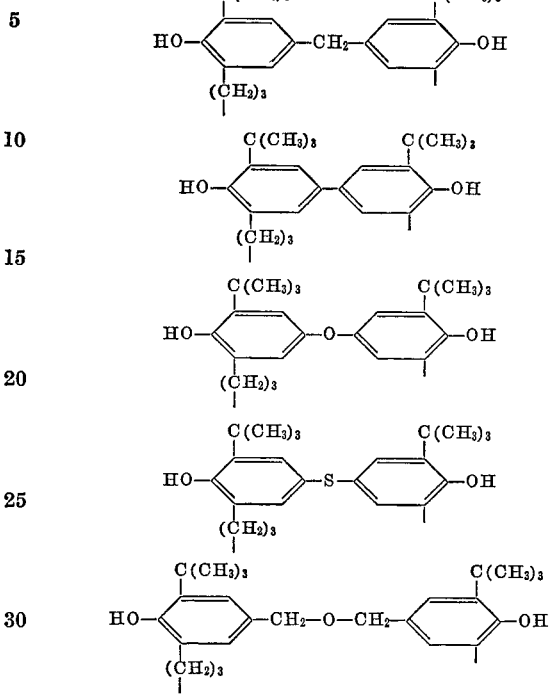

In the above formulas, the $$(CH_2)_3$$

radical is attached to a silicon atom of an adjacent polysiloxane chain.

The nature of the compositions within the scope of the present invention is best understood by reference to the preparation of the composition which contains the silicon-bonded t-butyl-substituted hydroxyarylpropyl radical. The general method of preparation involves a starting material which contains a phenyl nucleus containing a nuclear carbon-bonded hydroxyl group, and tertiary butyl radicals in both of the meta positions of such phenolic compound. An average of one or more, usually up to two of the nuclear-bonded t-butyl radicals, are replaced by allyl radicals. The allyl radical of this material is then reacted with an organopolysiloxane containing silicon-hydrogen linkages so as to attach the phenyl nucleus to the silicon atom through a propylene radical.

As a general illustration of this method, a commercial phenolic compound having the formula:

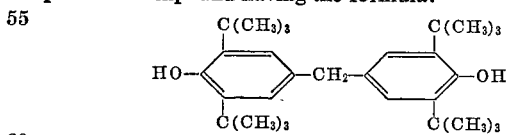

is dissolved in a mixture of toluene and ethanol and then an ethanol solution of potassium hydroxide is added to the solution. This results in the conversion of the phenol to the potassium phenylate. An amount of allyl chloride in ethanol sufficient to replace one tertiary butyl radical from each molecule is slowly added, the mixture is refluxed, salts are filtered, the product is washed and stripped to produce the allylated product having the formula:

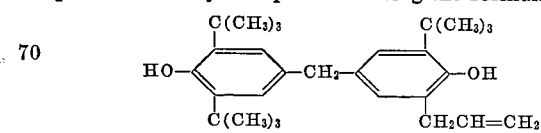

The allylated product is then reacted with the silicon-hydrogen-containing polysiloxane in the presence of a platinum compound catalyst conventionally used in SiH-olefin addition reaction to produce the desired product.

The preparation of the polysiloxanes within the scope of Formula 1 involves an SiH-olefin addition reaction. This reaction simply involves the addition of an alpha-olefin having from 6 to 12 carbon atoms, and an allylated t-butyl phenol to some type of methylhydrogenpolysiloxane. In the above formula, Y is as defined earlier. For example, the preparation of a methyl higher alkyl-polysiloxane of Formula 1 involves the reaction between a methylhydrogenpolysiloxane having the formula:

(7)        $(CH_3)_n(H)_{m+p}(R'')_qSiO_{\frac{4-m-n-p-q}{2}}$ where $n$, $m$, $p$, $q$ and $R''$ are as above defined, an alpha-olefin and an allylated t-butyl phenol.

The reaction of the alpha-olefin and the polysiloxane of Formula 7 can take place in the presence of one of the elemental platinum or platinum compound catalysts. The platinum compound catalyst can be selected from that group of platinum compound catalysts which are operative to catalyze the addition of silicon-hydrogen bonds across olefinic bonds.

Among the many useful catalysts for this addition reaction are chloroplatinic acid as described in U.S. Pat. 2,823,218—Speier et al., the reaction product of chloroplatinic acid with either an alcohol, an ether or an aldehyde as described in U.S. Pat. 3,220,972—Lamoreaux, trimethylplatinum iodide and hexamethyldiplatinum as described in U.S. Pat. 3,313,773—Lamoreaux, the platinum-olefin complex catalysts as described in U.S. Pat. 3,159,601 of Ashby and the platinum cyclopropane complex catalyst as described in U.S. Pat. 3,159,662 of Ashby.

The SiH-olefin addition reaction may be run at room temperature or at temperatures up to 200° C., depending upon catalyst concentration. The catalyst concentration can vary from $10^{-7}$ to $10^{-3}$ and preferably $10^{-5}$ to $10^{-4}$ moles of platinum as metal per mole of olefin containing molecules present. Generally, the methylhydrogenpolysiloxane is mixed with a portion of the alpha-olefin, the catalyst is added in aliquot portions as the reaction proceeds and the remaining alpha-olefin is added at a rate sufficient to maintain the reaction temperature in the neighborhood of from about 50° to 120° C. and, at the end of the addition of the alpha-olefin, the reaction is completed.

The addition reaction is effected by adding to the methylhydrogenpolysiloxane a platinum catalyst of one of the types previously described and then one of the allylated materials previously described is slowly added to the reaction mixture at a rate sufficient to maintain the reaction mixture at the desired reaction temperature, which is usually of the order of 50° to 120° C. The amount of the allylated material added to the reaction mixture is the amount which it is desired to react with the SiH-containing polysiloxane. The allylated aromatic compound is added in the ratio of from 0.005 to 1.0 molecule for every silicon-bonded hydrogen atom of the methylhydrogenpolysiloxane. This results in the conversion of each siloxane unit reacted, from a methylhydrogensiloxane unit to a siloxane unit containing one silicon-bonded methyl radical and one silicon-bonded t-butyl-substituted hydroxy arylpropyl radical. The appropriate amount of alpha-olefin is then added and reacted via the aforedescribed SiH-olefin addition reaction.

When preparing a linear copolymer of the type described in Formula 2 and included within the scope of Formula 1, the general procedure as described earlier is followed. The methylhydrogenpolysiloxane is first reacted with the appropriate amount of the allylated material and then the appropriate amount of alpha-olefin is added. For example, when it is desired to produce a product within the scope of Formula 1 in which $n$ is 1.1, $m$ is 0.925, $p$ is 0.025, and $q$ is 0, the starting material can be a trimethylsilyl chain-stopped methylhydrogenpolysiloxane containing an average of 38 methylhydrogensiloxane units per molecule. One mole of this methylhydrogenpolysiloxane is reacted with 1 mole of an allylated t-butyl-substituted phenol, such as

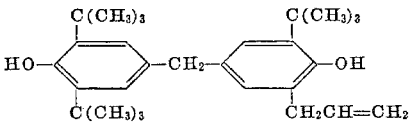

to produce a trimethylsilyl chain-stopped copolymer in which the average molecule contains 37 methylhydrogensiloxane units and 1 unit in which the $R'$ is the radical shown in the formula:

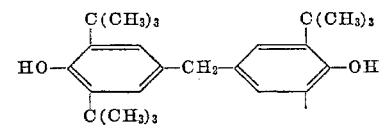

Then one mole of the resulting copolymer is reacted with 37 moles of an appropriate alpha-olefin, such as decene-1, according to the method previously described, to produce a copolymer within the scope of Formula 1, in which $n$ is 1.1, $m$ is 0.925, $p$ is 0.025 and $q$ is 0.

The following examples are illustrative of the practice of my invention and are not intended for purposes of limitation. All parts are by weight.

EXAMPLE 1

An allylated product of the formula:

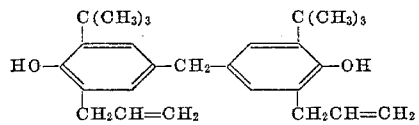

was prepared by dissolving 424 g. (1 mole) of 4,4'-methylene-bis-2,6-ditertiarybutylphenol in an equal weight of toluene and an equal weight of ethyl alcohol. One thousand grams of a solution containing 112 g. of potassium hydroxide in ethyl alcohol was made and slowly added to the phenol to provide the stiochiometric equivalent of the phenolic hydroxyl groups. A brilliant purpose solution resulted which, when dried, showed no evidence of phenol when tested for complete conversion to the potassium phenylate. An additional equivalent amount of ethyl alcohol was added and 2.2 moles of allyl chloride was slowly introduced to the reaction mixture, which was refluxed for 2 hours at 70° C. All solids were filtered from the reaction mixture and the product was washed and stripped. Infrared analysis showed that the phenylate had been converted to phenol and that allyl groups were in place. Nuclear magnetic reasonance evidence pointed to the replacement of some of the tertiary butyl groups of the aryl radicals by allyl radicals.

To a reaction vessel was added 60 g. of a liquid trimethylsilyl chain-stopped methylhydrogenpolysiloxane within the scope of Formula 7 containing 40 methylhydrogensiloxane units. To this mixture was added 0.00025 part of chloroplatinic acid hexahydrate and 5 g. of the allylated product prepared earlier in the example, over a period of 0.5 hour, while the temperature of the reaction mixture was maintained at 100° C. This resulted in a composition within the scope of Formula 2 having the average formula of Formula 2 in which R is tetradecyl, R' is a radical of the formula:

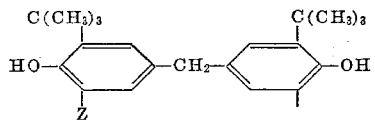

where Z is a $CH_2CH_2CH_2Si\equiv$ radical, the $Si\equiv$ is a silcon atom of an adjacent trimethylsilyl chain-stopped methylhydrogenpolysiloxane, $a$ has a value of 39.6 and $b$ has a value of 0.4. Since the sum of $a$ plus $b$ is equal to about 40 and since there are fewer than one of the t-butylhydroxyarylpropyl-substituted silicon atoms per 40 silicon atoms, it is apparent that the compositions of the present invention comprise a blend of products within the scope of Formula 2, some of which contain the internal antioxidant and some of which do not. The present blend contains one polysiloxane in which R is tetradecyl and $a$ is about 40, and copolymers within the scope of Formula 4 in which R is tetradecyl, R' is the radical shown above, the sum of $c$ plus $d$ is equal to about 40, $c$ is equal to 39 and $d$ is equal to 1.

When the copolymer of this example was evaluated in the standard Shell four ball wear test with aluminum and steel balls, the lubricating characteristics were found to be equivalent to the lubricating characteristics of a corresponding product which consisted solely of the trimethylsilyl chain-stopped methyltetradecylsiloxane in which the molecule contained an average of 40 methyltetradecylsiloxane units.

When this material was subjected to the oxidation stability test described earlier, the gel time was in excess of 120 hours at 200° C. In comparison to this, a product identical in all respects except that it did not contain the allylated phenol product, gelled in 30 hours at 150° C. and in 58 minutes at 200° C.

EXAMPLE 2

An aryl propyl-substituted siloxane was prepared by adding to a reaction vessel 240 g. (1 mole) of methylhydrogenpolysiloxane tetramer and 1568 g. (4 moles) of the allylated product of the formula:

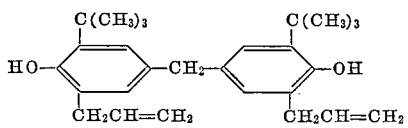

together with .05 g. of chloroplatinic acid hexahydrate. The chloroplatinic acid was added at once and the allylated product was slowly added over a 2 hour period while the temperature was maintained at 100° C. This resulted in a cyclic polysiloxane within the scope of Formula 5 in which $e$ was 4 and R' was a radical of the formula:

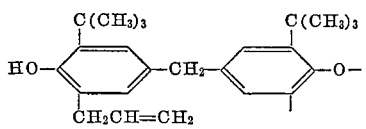

Two parts of this cyclopolysiloxane were added to 98 parts of a trimethylsilyl chain-stopped copolymer of methyltetradecylsiloxane units having an average of 40 methyltetradecylsiloxane units per molecule to produce a composition having an average formula within the scope of Formula 1 in which R is tetradecyl, R' is a radical of the formula:

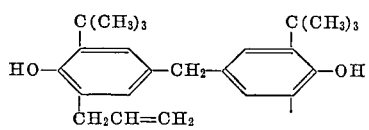

$n$ has a value of 1.095, $m$ has a value of 0.94 and $p$ has a value of 0.01. When this material was evaluated for oxidative stability, it showed a gel time in excess of 800 hours at 150° C. and 110 hours at 200° C.

EXAMPLE 3

To a reaction vessel was added 2070 g. (10 moles) of 2,6-di-t-butylphenol, 2000 g. of toluene and 2000 g. of ethyl alcohol. A solution of ethyl alcohol containing 560 g. (10 moles) KOH was made and added and this resulted in the conversion of the phenol to the phenylate. Additional ethyl alcohol was added and then 990 g. (11 moles) allyl chloride was slowly introduced. The mixture was refluxed for one hour at 100° C., the resulting product was filtered, the filtrate was washed and stripped to produce 2,6-t-butyl-4-allylphenol.

To a reaction vessel containing 240 g. (1 mole) of the cyclic tetramer of methylhydrogenpolysiloxane was slowly added 0.0005 g. of chloroplatinic acid hexahydrate and then was slowly added 764 g. of the t-butylallylphenol just prepared. This resulted in a cyclopolysiloxane within the scope of Formula 5 in which $e$ is 4 and R' is a radical of the formula:

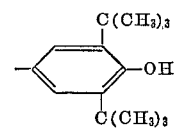

A composition within the scope of the present invention was prepared by adding 2 g. of the cyclotetrasiloxane just prepared to 98 g. of a trimethylsilyl chain-stopped methyltetradecylpolysiloxane containing an average of 40 methyltetradecylsiloxane units per molecule to produce a product within the scope of Formula 2 having an average composition of Formula 2 when R is tetradecyl, R' is the radical of the formula:

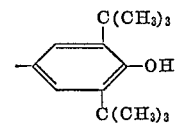

$a$ has a value of 39.8, and $b$ has a value of 0.1. When this material was evaluated for oxidative stability, it showed a gel time of over 800 hours at 150° C. and 42 hours at 200° C.

EXAMPLE 4

In accordance with the procedure of earlier examples, a bis-phenol having the formula:

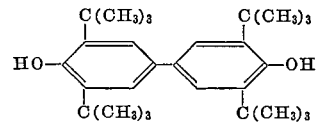

was converted to its allylated derivative by adding 4100 g. of the bis-phenol to a reaction vessel and dissolving the bis-phenol in 4000 g. of toluene and 4000 g. of ethyl alcohol. A solution of 1120 g. (20 moles) KOH in 20,000 g. ethyl alcohol was slowly added to the phenol and, again, a brilliant purple solution resulted and, when the solution was dried, the material tested for potassium phenylate. Then 1800 g. (20 moles) of allyl chloride in ethyl alcohol was slowly added, the mixture was refluxed for one hour at 100° C., a precipitate was filtered and the product was washed and dried to produce the diallyl derivative of the product. Nuclear magnetic resonance pointed to the replacement of some of the tertiary butyl groups on the aryl radicals by allyl radicals.

To a reaction vessel containing 240 g. (1 mole) of the cyclotetrasiloxane containing 4 methylhydrogensiloxane units, was added 0.005 g. of chloroplatinic acid hexahydrate and then 1640 g. of the allylated derivative was slowly added while the temperature was maintained at a temperature of 100° C. This resulted in a cyclopolysiloxane within the scope of Formula 5 in which $e$ has a value of 4 and R' is a radical of the formula:

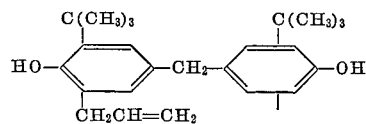

To 98 g. of a trimethylsilyl chain-stopped methyltetradecylsiloxane containing an average of 2 methyl tetradecylsiloxane units per molecule was added 2 g. of the cyclotetrasiloxane which had been reacted with the allylated derivative. When this material was evaluated for oxidative stability, it was found to have a gel time in excess of 800 hours at 150° C. and of at least 80 hours at 200° C.

EXAMPLE 5

Following the procedure of my aforementioned copending application Ser. No. 421,588, a trimethylsilyl chain-stopped methylhydrogenpolysiloxane containing an average of 31 methylhydrogensiloxane units per molecule was prepared. To one mole of this fluid was added one mole of the allylated 2,6-di-t-butylphenol of Example 3, employing 0.0005 g. of chloroplatinic acid hexahydrate as a catalyst. Thereafter, 3472 g. (31 moles) of octene-1 were slowly added to the reaction mixture to convert the remaining silicon-hydrogen linkages to silicon-bonded octyl radicals. This resulted in a composition within the scope of Formula 2 which was a homopolymer in which R is octyl, R' is the radical of the formula:

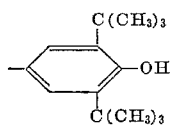

$a$ has a value of 30, and $b$ has a value of 1. Upon evaluation of the oxidative stability of this composition, it was found that the composition was stable for over 800 hours at 150° C. and for over 40 hours at 200° C.

EXAMPLE 6

An allylated product of the formula:

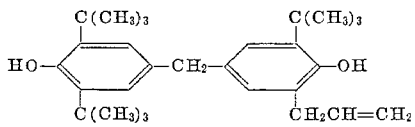

was prepared by dissolving 424 g. (1 mole) of 4,4'-methylene-bis-2,6-ditertiarybutylphenol in an equal weight of ethyl alcohol. One thousand grams of a solution containing 112 g. of potassium hydroxide in ethyl alcohol was made and slowly added to the phenol to provide the stoichiometric equivalent of the phenolic hydroxyl groups. A brilliant purple solution resulted which, when dried, showed no evidence of phenol and tested completely for complete conversion to the potassium phenylate. An additional equivalent amount of ethyl alcohol was added and 1.5 moles of allyl chloride was slowly introduced to the reaction mixture, which was refluxed for 2 hours at 70° C. All solids were filtered from the reaction mixture and the product was washed and stripped. Infrared analysis showed that the phenylate had been converted to phenol and that the allyl group was in place. Nuclear magnetic resonance evidence pointed to the replacement of some of the tertiary butyl groups of the aryl radicals by allyl radicals.

To a reaction vessel was added 300 g. of a liquid trimethylsilyl chain-stopped methylhydrogenpolysiloxane of the formula:

$$(CH_3)_{1.5}(H)_{0.75}SiO_{0.875}$$

To this mixture was added 0.00125 g. of chloroplatinic acid hexahydrate and 28.8 g. of the allylated product over a period of 0.5 hour, while the temperature of the reaction mixture was maintained at 110° C. External heating was discontinued. Then 500 g. of decene-1 was slowly added to the reaction mixture over a one hour period, during which time the temperature was maintained at 110° C. by the exothermic reaction resulting from the addition. After complete addition of the decene-1, heat was applied to the flask to maintain temperature at 110° C. for an additional 30 minutes to insure that all ≡SiH is totally reacted and then the reaction product was vacuum stripped at 282° C. and 10 mm. Hg, using a nitrogen purge. This resulted in a base oil within the scope of Formula 1 in which R is decyl, R' is a radical of the formula:

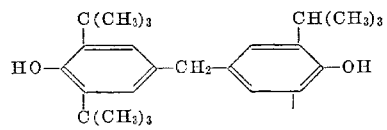

$n$ has a value of 1.5, $m$ has a value of .734 and $p$ has a value of 0.016. Since there are fewer than one of the t-butylhydroxyarylpropyl-substituted silicon atoms per 8 silicon atoms and the polysiloxane contains 8 silicon atoms per molecule, it is apparent that the compositions of the present invention comprise a blend of products within the scope of Formula 1, some of which contain the internal antioxidant radical and some of which do not.

To 36 grams of the base oil and 18 grams of lithium myristate in a grease kettle were added 0.75 gram of a polyether of the formula:

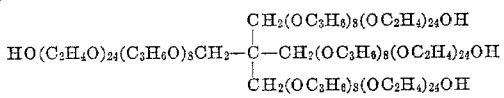

and 0.01 gram of finely divided lithium hydroxide. The mixture was stirred and heated to 240° C. The mixture was maintained at 240° C. for 10 minutes with stirring. The mixture was then slowly cooled at a rate of 1.4° C. per minute to 150° C., at which temperature 0.45 gram of N-phenyl-alpha-naphthylamine, 0.1 gram of finely divided lithium hydroxide, 36 grams of the base oil and 7 grams of lithium myristate were added. The slow cooling was continued to room temperature. The mixture was then milled three times through a Morehouse colloid mill set at 3 mils clearance. The resulting material was a light grade (290–330 penetration) grease with the following properties:

Penetration—296
Bleed 24 hours at 150° C.—7.8%
Evaporation 24 hours at 150° C.—1.4%
Appearance—Smooth grease, purple in color The grease was used to lubricate the oscillating recording mechanism in a chart recorder and was still functioning perfectly after 6 months of continuous use. Under identical conditions, a commercial petroleum grease failed after 2 weeks.

A windshield wiper mechanism consisting of a cam operating in a housing was lubricated with the grease of the present example and operated for 6 months with no difficulty. The same mechanism lubricated with petroleum grease failed after 200 hours. A result similar to that achieved with the petroleum grease was achieved using a conventional silicone grease.

EXAMPLE 7

To a reaction vessel was added 300 g. of a liquid trimethylsilyl chain-stopped methylhydrogenpolysiloxane of the average unit formula:

$$(CH_3)_{1.16}(H)_{0.92}SiO_{0.96}$$

To this mixture was added 0.00125 gram of chloroplatinic acid hexahydrate and 28.8 grams of the allylated product described in Example 6 over a period of 0.5 hour, while the temperature of the reaction mixture was maintained at 110° C. Heating was discontinued. Then 683 grams of decene-1 was added slowly to the reaction mixture over a one hour period, during which time the temperature was maintained at 110° C. by the exothermic reaction resulting from the addition. After complete addition of the decene-1, heat was applied to the flask to maintain the temperature at 110° C. for an additional 30 minutes to insure that all ≡SiH was totally reacted and then the reaction product was vacuum stripped at 292° C. and 10 mm. Hg using a nitrogen purge. This resulted in a base oil within the scope of Formula 1 where R is decyl, R' is a radical of the formula:

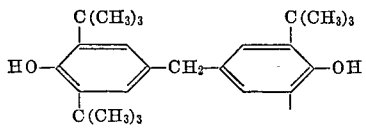

$n$ has a value of 1.16, $m$ has a value of 0.906 and $p$ has a value of 0.0145. Since $p$, the ratio of the t-butylhydroxyaryl radicals to silicon atoms, is less than one in 25 and there are 25 silicon atoms per polysiloxane molecule, it is apparent that the compositions of the present invention comprise a blend of products within the scope of Formula 1 in which the majority of the polysiloxane molecules contain one R' radical and a minor amount of the polysiloxane molecules which do not contain an R' radical.

To 36 grams of the base oil and 18 grams of lithium myristate in a grease kettle were added 0.75 gram of a polyether of the formula:

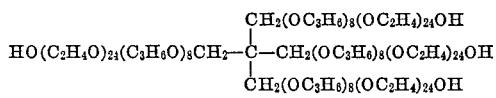

and 0.01 gram of finely divided lithium hydroxide. The mixture was stirred and heated to 240° C. The mixture was maintained at 240° C. for 10 minutes with stirring. The mixture was then slowly cooled at a rate of 1.4° C. per minute to 150° C. at which temperature 0.45 gram of N-phenyl-alpha-naphthylamine, 0.1 gram of finely divided lithium hydroxide, 36 grams of the base oil and 7 grams of lithium myristate were added. The slow cooling was continued to room temperature. The mixture was then milled three times through a Morehouse colloid mill set at 3 mils clearance. The resulting material was a light grade (290–330 penetration) grease.

EXAMPLE 8

To a reaction vessel was added 300 grams of a liquid trimethylsilyl chain-stopped methylhydrogenpolysiloxane of the formula:

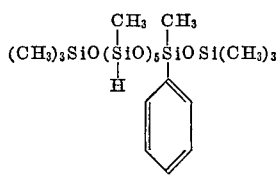

Over a period of 0.5 hour, to this mixture was added 0.00125 gram of chloroplatinic acid hexahydrate and 28.8 grams of an allylated product of the formula:

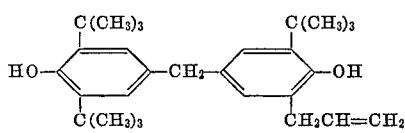

while the temperature of the reaction mixture was maintained at 110° C. Heating was discontinued and 440.0 grams of dodecene-1 was added slowly to the reaction mixture over a one hour period, during which time the temperature was maintained at 110° C. by the exothermic reaction resulting from the addition. After complete addition of the dodecene-1, heat was applied to the flask to maintain temperature at 110° C. for an additional 30 minutes to insure that all $\equiv$SiH was totally reacted. The reaction product was then vacuum stripped at 282° C. and 10 mm. Hg, using a nitrogen purge. This resulted in a base oil within the scope of Formula 1 where R is dodecyl, R' is a radical of the formula:

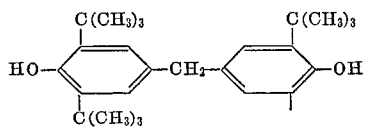

$n$ has a value of 1.5, $m$ has a value of 0.60, $p$ has a value of 0.0186 and $q$ has a value of 0.125. Since there is an average of only 0.146 inhibitor radicals per polysiloxane molecule, it is apparent that the compositions of the present invention comprise a blend of products within the scope of Formula 1, some of which contain one inhibitor radical but the majority of which do not.

To 36 grams of the base oil and 18 grams of lithium myristate in a grease kettle were added 0.75 gram of a polyether of the formula:

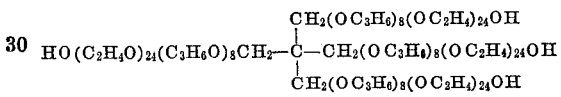

and 0.01 gram of finely divided lithium hydroxide. The mixture was stirred and heated to 240° C. The mixture was maintained at 240° C. for 10 minutes with stirring. The mixture was then slowly cooled at a rate of 1.4° C. per minute to 150° C. at which temperature 0.45 gram of N-phenyl-alphanaphthylamine, 0.1 gram of finely divided lithium hydroxide, 36 grams of the base oil and 7 grams of lithium myristate were added. The slow cooling was continued to room temperature. The mixture was then milled three times through a Morehouse colloid mill set at 3 mils clearance. The resulting material was a light grade (290–330 penetration) grease.

EXAMPLE 9

Into a 3 liter flask was added 400 grams of dry toluene. To this was added at room temperature 556 grams of a polysiloxane of the formula:

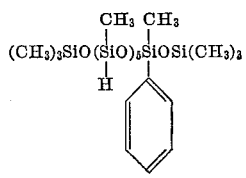

along with 48.0 grams (4 wt. percent) of an allylated product of the formula:

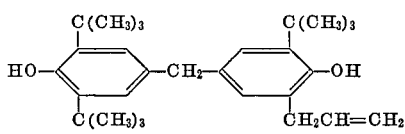

To this mixture was added 0.00125 gram of chloroplatinic acid hexahydrate. The flask was fitted with an agitator, thermometer, condenser and addition funnel. The mixture was then heated to 100° C. and held there for 30 minutes to allow reaction of the antioxidant.

Into the addition funnel was introduced 724 grams of decene-1. The heating of the flask was discontinued and the decene-1 was added dropwise maintaining the temperature at 100° C. After complete addition of the decene-1, heat was applied to the flask to maintain the temperature at 100° C. for an additional 30 minutes.

The mixture was then checked for completeness of reaction. When observed to be totally reacted, the mixture was cooled to room temperature. The flask and contents were heated to 300° C. under 1 to 5 mm. Hg, and held there 30 minutes to remove volatiles using a nitrogen sparge.

The fluid was then allowed to cool to room temperature and was removed from the flask by vacuum distillation. The fluid was filtered through fuller's earth to remove any impurities.

A comparison fluid was prepared which was identical in all respects except that the phenyl radical was replaced by a decyl radical. This second material was used as a control. The first material was considered as standard. A comparison of the physical properties of the two fluids is set forth in the following table.

TABLE I

| Property | Requirements | Standard | Control |
|---|---|---|---|
| Viscosity kinematic centistokes ° F.: | | | |
| 450 | 0.5 minimum | 2.1 | 1.8 |
| 210 | 2.0 minimum | 9.6 | 7.5 |
| 100 | 8.0 minimum | 44.5 | 31.4 |
| 77 | 70.0 maximum | 71.8 | 48.8 |
| −44 | 15,000 maximum | 5237 | 2981 |
| −50 | 37,000 maximum | 10,147 | 6125 |
| Pour point, ° F. | −65 minimum | Ok | Ok |
| Bulk modulus adiabatic tangent 300° F., 3,000 p.s.i. | 139,000 minimum | 140,120 | 135,210 |

The standard and control fluids were then heated to 450° F. and held at 450° F. for 72 hours under nitrogen atmosphere at 35 p.s.i.g. The results on the treatment of the viscosity of the materials is set forth in the following table.

TABLE II

| Property | Requirement | (Standard) | | | (Control) | | |
|---|---|---|---|---|---|---|---|
| | | Standard unused | Standard test | Percent | Control unused | Control test | Percent |
| Change in kinematic viscosity percent ° F.: | | | | | | | |
| −50 | ±15 | 10,147 | 9,540 | −7 | 6,170 | Solid | |
| 0 | ±8 | 749 | 715 | −4 | 468 | 544 | +16 |
| 100 | ±2 | 44.2 | 44.2 | −.5 | 31.4 | 34.7 | +11 |
| 210 | ±1 | 9.6 | 8.75 | −9 | 7.5 | 7.6 | +1.3 |

The control fluid began to solidify at −35° F. As can be seen from the table, the viscosity of the standard decreased after the heat treatment. This excellent low temperature viscosity property, coupled with the high bulk modulus or low compressibility of the standard, make it an ideal hydraulic fluid for aircraft use under the severe temperature conditions found in such application.

While the foregoing examples have illustrated many of the compositions within the scope of the present invention, it should be understood that these compositions comprise, broadly, organopolysiloxanes in which the majority of the silicon atoms contain silicon-bonded higher alkyl radicals but in which a small portion of the silicon atoms within the definition contain silicon-bonded t-butyl-substituted hydroxyarylpropyl radicals of the type described. The compositions can, optionally, in addition to the above radicals, also contain a minor number of aryl and/or aralkyl radicals.

These compositions are extremely useful in applications where the organopolysiloxane must be used as a lubricant for reducing the sliding friction between various metal parts and particularly in environments where this sliding friction occurs at elevated temperatures. The elevated temperature oxidation stability of the compositions of the present invention make them extremely useful for such applications.

While the products of this invention have been described as liquid materials, it should be known that these compositions can also be thickened with suitable thickening agents, such as finely divided silica, and employed as silicone greases and compounds for lubricating under situations where a fluid material is not as desirable as a grease lubricant.

What I claim as new and desire to secure by Letters Patent of the United States is:

1. An organopolysiloxane composition having an average unit formula:

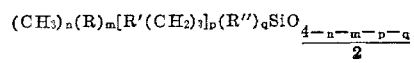

wherein the sum of $(m+n+p+q)$ has a value of from 2.05 to 3.0 $n$ has a value of from 0.5 to 1.95; $m$ has a value of from 0.5 to 1.0; $p$ has a value of from 0.005 to 0.1; $q$ has a value of from 0 to $\frac{1}{4}$ $(m+n+p)$; R represents a higher alkyl radical; R' is a t-butyl-substituted hydroxyaryl radical; and R'' is selected from the class consisting of mononuclear aryl radicals, binuclear aryl radicals, and mononuclear aryl lower alkyl radicals.

2. A composition of claim 1 wherein R' is a monovalent radical.

3. A composition of claim 1 wherein R' is a divalent radical.

4. A composition of claim 1 wherein R' is a mixture of monovalent and divalent radicals.

5. A composition of claim 1 wherein R'' is phenyl.

6. A composition of claim 1 wherein R' is a monovalent radical and R'' is phenyl.

7. An organopolysiloxane composition having an average fromula:

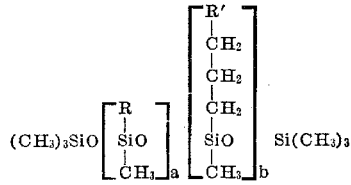

where R is a higher alkyl radical, R' is selected from the class consisting of monovalent and divalent hindered t-butyl-substituted hydroxyaryl radicals, the sum of $a$ plus $b$ is from 5 to 40, inclusive, and the ratio of $b$ over the sum of $a$ plus $b$ is from 0.005 to 0.1, inclusive.

8. The composition of claim 7 in which the t-butyl-substituted hydroxyaryl radical is selected from the class consisting of radicals having the formulas:

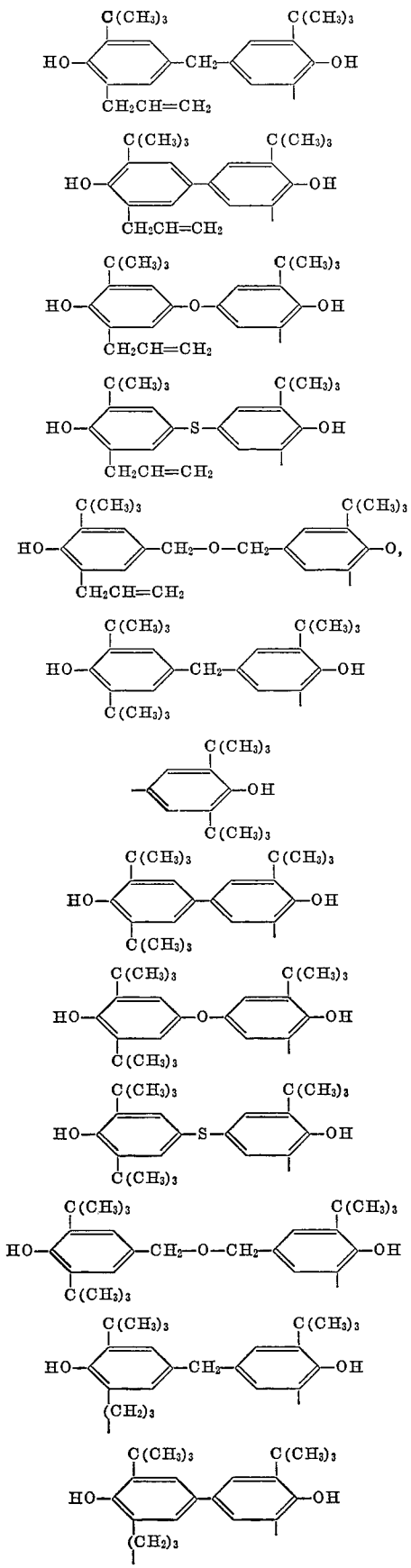

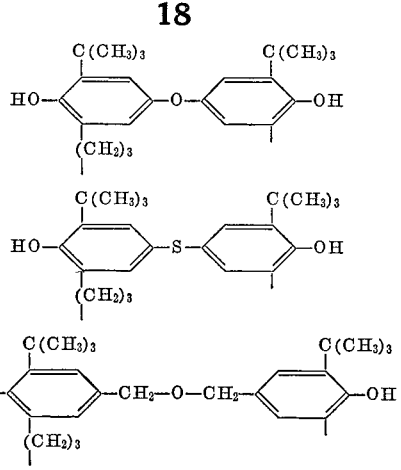

where the

represents a propylene group which is attached to a silicon atom of an adjacent polysiloxane chain.

9. A composition of claim 7 in which R is tetradecyl.
10. A composition of claim 8 which is a mixture of a first organopolysiloxane having the formula:

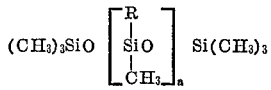

and a second organopolysiloxane having the formula:

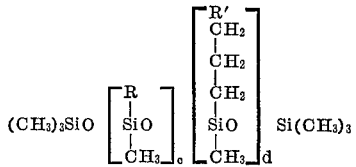

where $a$ has a value of from 5 to 40, inclusive, $c$ has a value of from 0 to 39, inclusive, $d$ has a value of from 1 to 40, inclusive, and the sum of $c$ plus $d$ is equal to from 1 to 40.

11. A composition of claim 7 which consists essentially of a polymeric material having the formula:

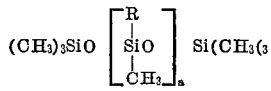

and a polymeric material having the formula:

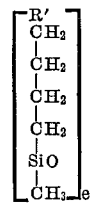

where $a$ has a value of from 5 to 40, inclusive, and $e$ has a value of from 3 to 7, inclusive.

References Cited
UNITED STATES PATENTS

| | | | |
|---|---|---|---|
| 3,137,720 | 1/1964 | Cooper | 260—448.2 |
| 3,328,350 | 6/1967 | Omietanski et al. | 260—448.2X |
| 3,231,496 | 1/1966 | Pater | 252—49.6 |

DANIEL E. WYMAN, Primary Examiner
W. H. CANNON, Assistant Examiner

U.S. Cl. X.R.

252—49.6, 78; 260—448.2